United States Patent
Nossova et al.

(10) Patent No.: US 12,257,569 B2
(45) Date of Patent: Mar. 25, 2025

(54) CATALYZED PARTICULATE FILTER FOR SOOT REMOVAL FROM ENGINE EXHAUST

(71) Applicant: HER MAJESTY THE QUEEN IN RIGHT OF CANADA AS REPRESENTED BY THE MINISTER OF NATURAL RESOURCES, Ottawa (CA)

(72) Inventors: Lioudmila Nossova, Ottawa (CA); Gianni Caravaggio, Ottawa (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 608 days.

(21) Appl. No.: 17/595,279

(22) PCT Filed: Apr. 16, 2020

(86) PCT No.: PCT/CA2020/050506
§ 371 (c)(1),
(2) Date: Nov. 12, 2021

(87) PCT Pub. No.: WO2020/257919
PCT Pub. Date: Dec. 30, 2020

(65) Prior Publication Data
US 2022/0241757 A1 Aug. 4, 2022

Related U.S. Application Data

(60) Provisional application No. 62/865,356, filed on Jun. 24, 2019.

(51) Int. Cl.
| | | |
|---|---|---|
| *B01J 23/50* | (2006.01) | |
| *B01J 6/00* | (2006.01) | |
| *B01J 21/06* | (2006.01) | |
| *B01J 37/04* | (2006.01) | |
| *B01J 37/08* | (2006.01) | |
| *F01N 3/10* | (2006.01) | |

(52) U.S. Cl.
CPC .............. *B01J 23/50* (2013.01); *B01J 6/001* (2013.01); *B01J 21/066* (2013.01); *B01J 37/04* (2013.01); *B01J 37/08* (2013.01); *F01N 3/10* (2013.01)

(58) Field of Classification Search
CPC . B01J 23/50; B01J 6/001; B01J 21/066; B01J 37/04; B01J 37/08; F01N 3/10
USPC ............... 502/347, 349; 423/213.2, 239.1
See application file for complete search history.

(56) References Cited

U.S. PATENT DOCUMENTS

2011/0076202 A1 * 3/2011 Asanuma ............... B01D 53/94
422/177

FOREIGN PATENT DOCUMENTS

| CN | 103638928 A | * | 3/2014 | .............. B01J 23/66 |
| EP | 1541219 A1 | * | 6/2005 | ......... B01D 53/9413 |

OTHER PUBLICATIONS

Nossova, L. et al., "Effect of preparation method on the performance of silver-zirconia catalysts for soot oxidation in diesel engine exhaust", Applied Catalysis B: Environmental, 225, 538-549, available online at https://doi.org/10.1016/j.apcatb.2017.11.070 on Nov. 27, 2017 (Nov. 27, 2017).

* cited by examiner

*Primary Examiner* — Patricia L. Hailey
(74) *Attorney, Agent, or Firm* — Daniel C. Pierron; Widerman Malek, PL

(57) ABSTRACT

The invention discloses use of a catalyzed particulate filter loaded with a silver-zirconia catalyst prepared by citric acid-assisted sol-gel method for soot removal from engine exhaust. The invention discloses a method of making xAg/$ZrO_2$ where x is 20 mol %, said method comprises: mixing aqueous solutions of $AgNO_3$ and $ZrO(NO_3)_2$ hydrate to produce a first mixture, adding an aqueous solution of citric acid to the first mixture, wherein the molar ratio of metal ions to citric acid is about 1:3 to produce a second mixture; heating the second mixture to about 80-90° C. to evaporate excess water in the second mixture to form a viscous gel, charring the viscous gel at about 200° C. for about 12 hours to produce a foam-like material, grounding the foam-like material to form a grounded material, and calcinating the grounded material at 500° C. for about 10 hours.

5 Claims, 6 Drawing Sheets

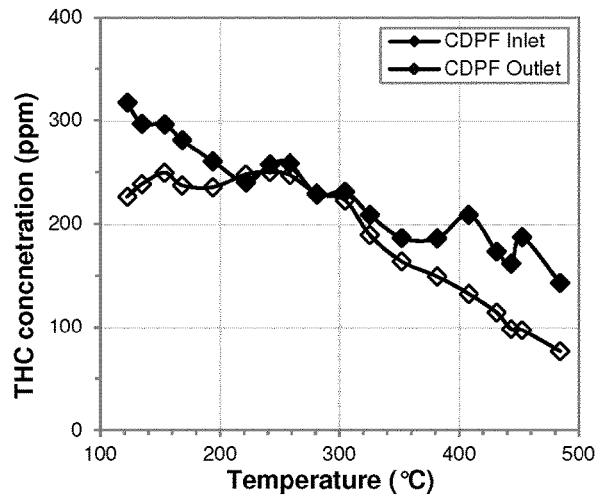
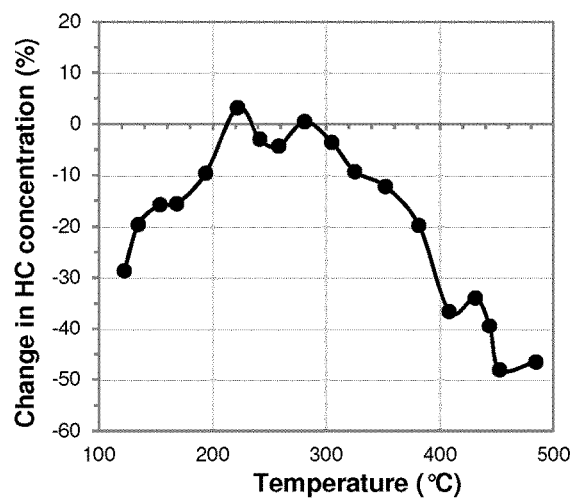
Figure 9A
Figure 9B
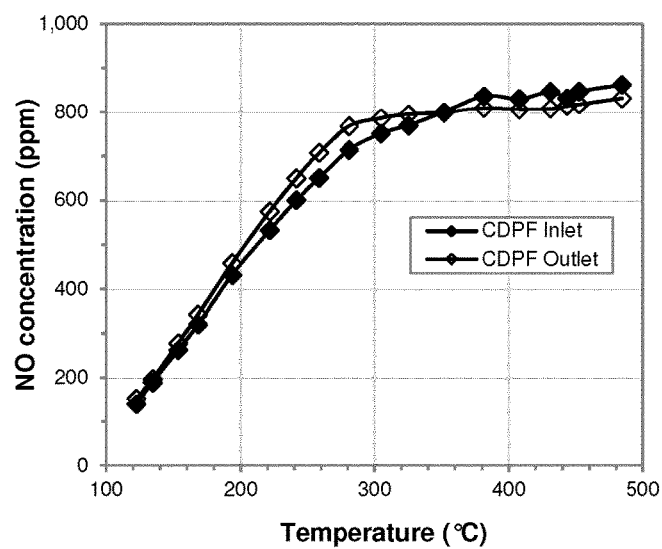
Figure 10

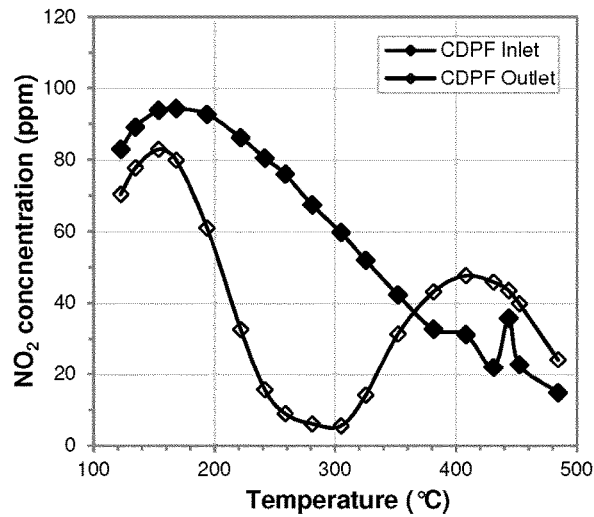 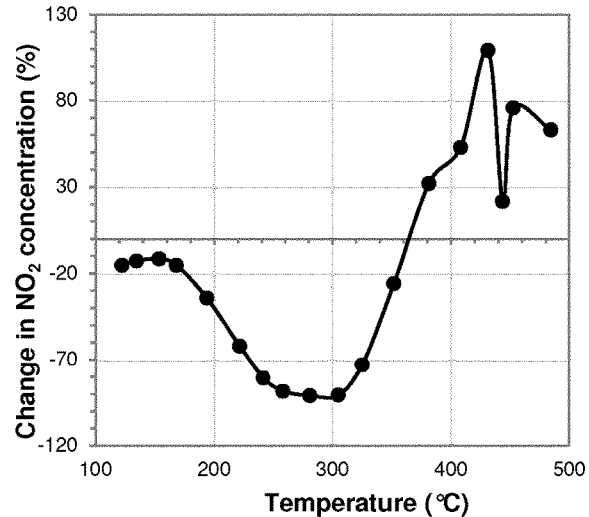
Figure 11A                    Figure 11B
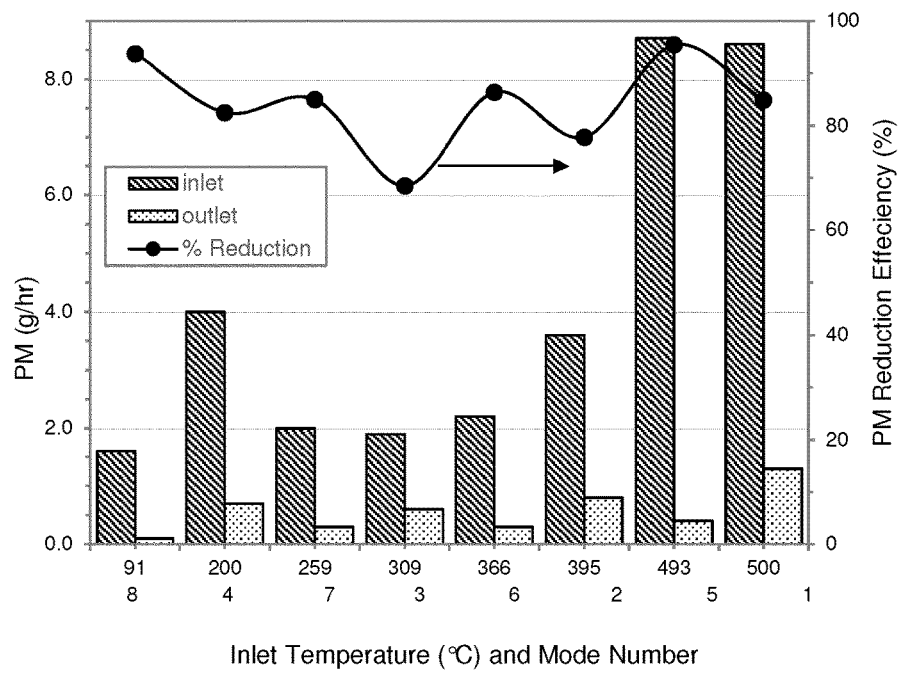
Figure 12

CATALYZED PARTICULATE FILTER FOR SOOT REMOVAL FROM ENGINE EXHAUST

RELATED APPLICATIONS

This application is a national phase application of and claims priority under 35 U.S.C. § 371 of PCT Patent Application Serial No. PCT/CA2020/050506 filed on Apr. 16, 2020 and titled CATALYZED PARTICULATE FILTER FOR SOOT REMOVAL FROM ENGINE EXHAUST, which in turn claims priority under 35 U.S.C. § 119 (e) of U.S. Provisional Patent Application Ser. No. 62/865,356 filed on Jun. 24, 2019 and titled CATALYZED PARTICULATE FILTER FOR SOOT REMOVAL FROM LEAN-BURN INTERNAL COMBUSTION ENGINE EXHAUST. The contents of these applications are incorporated herein by reference.

FIELD OF THE INVENTION

The present invention relates to novel and efficient silver-zirconia catalyzed particulate filter for soot removal from engine exhaust.

BACKGROUND OF THE INVENTION

A major concern with lean-burn internal combustion engines is the emission of particulate matter (PM) into the atmosphere, which affects the environment, human health and contributes to climate change.

Said particulate matter mainly consists of solid carbonaceous compounds, collectively referred to as soot, which is removed from lean-burn exhaust by filtering with a particulate filter.

A critical issue of filtering with a particulate filter is the necessity of performing active filter regeneration, a process of eliminating trapped soot particles by combustion, which is accomplished at temperatures above 600° C.

The methods used for active regeneration are normally complex and result in the reduction of particulate filter life, as well as fuel overconsumption, which is not aligned with the global goal of $CO_2$ emission reduction.

Coating the particulate filter with a soot oxidation catalyst lowers the temperature of soot combustion, reduces the frequency for active regeneration and allows for filter self-regeneration (passive regeneration) during normal operating conditions.

Catalyzed particulate filters have been developed for application in lean-burn internal combustion engines.

As an example, passive filter regeneration is used in Continuously Regenerating Trap (CRT®), a commercially available technology. The CRT® performs the combustion of PM at normal exhaust temperatures of 200-500° C. with the help of $NO_2$ produced by the diesel oxidation catalyst, which oxidizes NO in diesel exhaust. In order for the CRT to function effectively, the technology requires a high $NO_2$ to PM ratio (>20) and a low sulphur concentration of <50 ppm in the exhaust.

Modified catalyzed CRT® (CCRT®) uses an additional catalyst loaded on the filter in order to increase the amount of $NO_2$ for soot oxidation but this leads to the risk of $NO_2$ slip.

$NO_2$-based regeneration used in CRT starts from 250-300° C. depending on the application. The CCRT® configuration represents about 25° C. temperature advantage.

One of the limitations or a drawback of the above-mentioned technologies (CRT® and CCRT®) is that they function effectively for soot oxidation at a high NO concentration in the exhaust that overwhelms the $DeNO_x$ converter and leads to $NO_x$ slip, which becomes an issue to comply with newer and stricter $NO_x$ emission standards.

Moreover, metals used for coating the commercial DPF consist of platinum group metals often in combination with cerium/zirconium oxides. Since platinum group metals are expensive and highly sensitive to sulphur, their substitution by a cheaper active phase would be desirable.

As an alternative to the CRT® and CCRT® technologies, there are also catalyzed soot filters (CSFs) or catalyzed diesel particulate filters (CDPFs) in which the catalyst is on the filter and no pre-catalyst is used. These systems are only used in special circumstances, for example, when the installation space is not large enough for the CRT® and the required exhaust gas temperature is warranted to be >280° C. for at least 50% of the operating time.

Other companies, for example, DCL International Inc, CDTi Advanced Materials Inc., Catalytic Exhaust Products Ltd., have developed base metal coated diesel particulate filter (DPF) for off-road applications, usually placed before a Selective Catalytic Reduction (SCR) device. This type of catalytic coating is less sensitive to sulphur in fuel, does not produce sufficient amount of $NO_2$ and initiates regeneration in the temperature range between 380 and 425° C. depending on the type of engine and the type of application.

Catalyzed particulate filter using base metals for coating provides passive regeneration at higher temperature compared to the noble metal-based technologies, thus the preferable application is on high load equipment in order to satisfy high temperature requirements.

The development of more efficient combustion technologies for lean-burn internal combustion engines in response to new fuel economy standards has created new challenges for catalyst development. Effective catalytic performance has to be achieved for soot oxidation under conditions associated with advanced, efficient engine operation, which include lower exhaust temperatures and lower concentrations of NO.

Catalyst formulations have been studied as potential materials for soot oxidation by oxygen. Among catalysts free of platinum group metals, silver was found to be a potential promising metal for oxidizing soot at typical exhaust temperatures of lean-burn engines. The high activity of Ag-based catalysts for soot oxidation by oxygen was linked to the so-called "active oxygen-assisted mechanism" by which metallic silver activated oxygen through a dissociative adsorption process.

Among the studies of supported silver catalysts for soot oxidation, most have used impregnation, citrate sol-gel and co-precipitation techniques for preparing these catalysts. The complexation of catalyst precursors with citric acid provides homogeneous component mixing which is maintained during the gelation step. The subsequent thermal decomposition of a citrate gel polymer yields more effective catalysts due to a higher degree of component homogeneity than when prepared by conventional methods.

The inventors of the present application conducted studies to compare the physicochemical and catalytic soot oxidation properties of $Ag/ZrO_2$ catalysts prepared by different methods. Two series of zirconia-supported silver catalysts with various silver contents (5-30 mol %) were prepared either by citrate sol-gel method or by incipient wetness impregnation. The silver-zirconia catalysts were denoted as $xAg/ZrO_2$, where x is the mole fraction of Ag in % (i.e. x=5, 10, 20, 30) and corresponding zirconium concentrations of 95, 90, 80 and 70 mol %, respectively. The catalysts were thoroughly characterized by various techniques. The influence of the preparation method on catalyst characteristics was considered. The catalyst performance for soot oxidation was conducted by temperature-programmed oxidation (TPO) using carbon black (CB) as a model of soot. The best performing catalyst was then tested in a fixed-bed reactor under simulated diesel exhaust conditions using tight contact between the catalyst and carbon particles. The difference in activity between impregnated and sol-gel catalysts was linked to differences in the catalyst structure and oxygen adsorption. See "Effect of preparation method on the performance of silver-zirconia catalysts for soot oxidation in diesel engine exhaust", L. Nossova, G., Caravaggio, M, et al. *Applied Catalysis B: Environmental*, 225, (2018) 538-549.

This study demonstrated that the catalyst preparation method significantly influences the physical and catalytic properties of silver-zirconia catalysts. The citrate sol-gel preparation method showed better catalytic performance for soot oxidation according to TPO results. This preparation method comprised mixing aqueous solutions of metal precursors, $AgNO_3$ and $ZrO(NO_3)_2$ hydrate (Sigma Aldrich™), with desired molar ratios followed by addition of an aqueous solution of citric acid under vigorous stirring. The molar ratio of metal ions to citric acid was 1:3. The final mixture was heated to 80-90° C. under stirring to evaporate the excess water until a viscous gel was formed. Then the gel was charred at 200° C. for 12 h resulting in a brown coloured and foam-like fragile material. This product was grounded with a mortar and pestle followed by calcination at 550° C. for 6 h.

The best performing soot oxidation silver-zirconia catalyst in TPO runs was found to be the sol-gel $30Ag/ZrO_2$ catalyst. Additionally, this catalyst exhibited a high activity for soot oxidation when it was evaluated under simulated diesel exhaust conditions. This allows considering the $30Ag/ZrO_2$ catalyst as a promising candidate for application in a catalyzed particulate filter for oxidizing soot with $O_2$ at normal engine operating conditions ($O_2$-based technology). It could be used as an alternative to $NO_2$-based technology, which uses expensive Pt catalyst.

Therefore, there remains the need for an efficient and less expensive catalyzed particulate filter loaded with silver-zirconia catalyst for soot removal.

SUMMARY OF THE INVENTION

The present invention discloses making and use of an efficient catalyzed particulate filter loaded with silver-zirconia catalyst for soot removal from engine exhaust.

According to one aspect of the invention, there is provided a use of a catalyzed particulate filter, said particulate filter is loaded with a silver-zirconia catalyst, for soot removal from engine exhaust, wherein the silver-zirconia catalyst is prepared by citric acid-assisted sol-gel method.

Preferably, the silver-zirconia catalyst is $xAg/ZrO_2$, where x is the mole fraction of Ag in %, wherein the Ag content x is 5-30 mol %.

Preferably, the Ag content x is 20-30 mol %. More preferably, the Ag content x is 30 mol %. Still more preferably, the Ag content x is 20 mol %.

Preferably, the soot removal from engine exhaust is for lean-burn internal combustion.

According to another aspect of the invention, there is provided a method of making a catalyst $xAg/ZrO_2$ where x is 20 mol %, said method comprises:

mixing aqueous solutions of $AgNO_3$ and $ZrO(NO_3)_2$ hydrate to produce a first mixture, adding an aqueous solution of citric acid to the first mixture, wherein the molar ratio of metal ions to citric acid is about 1:3 to produce a second mixture, heating the second mixture to about 80-90° C. to evaporate excess water in the second mixture to form a viscous gel, charring the viscous gel at about 200° C. for about 12 hours to produce a foam-like material, grounding the foam-like material to form a grounded material, and calcinating the grounded material at 500° C. for about 10 hours.

The present invention also discloses the use of catalyst $20Ag/ZrO_2$ loaded on a particulate filter, for soot removal from engine exhaust.

Preferably, the soot removal from engine exhaust is for lean-burn internal combustion.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein:

FIG. 9A shows the Total Hydrocarbons (THC) emissions as a function of inlet temperature as measured at the CDPF inlet and outlet ports, and FIG. 9B shows the % change in THC concentration under testing conditions.

FIG. 10 shows NO emissions as a function of inlet temperature as measured at the CDPF inlet and outlet ports.

FIG. 11A shows $NO_2$ emissions as a function of inlet temperature as measured at the CDPF inlet and outlet ports, and FIG. 11B shows the % change in $NO_2$ concentration under testing conditions.

FIG. 12 shows PM emissions tested during 8-mode testing cycle and PM reduction efficiency.

DETAILED DESCRIPTION OF THE INVENTION

Figure 1:
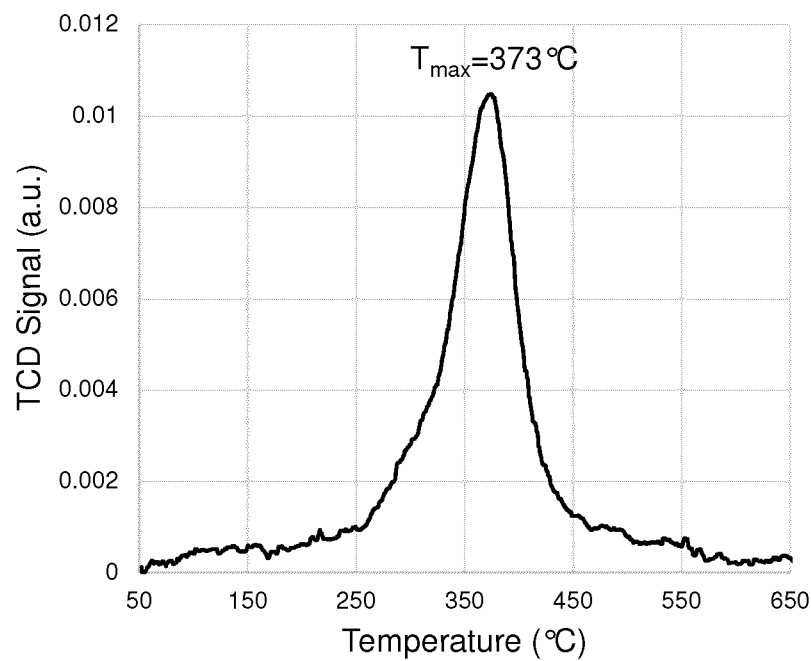
FIG. 1 shows the Temperature Programmed Oxidation (TPO) profile for $30Ag/ZrO_2$ catalyst for carbon oxidation (10 vol % $O_2$/He, tight contact, catalyst:carbon ratio=30:1).

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

The present invention discloses a catalyzed particulate filter, which uses the silver-zirconia catalyst supported on porous cordierite wall-flow substrate and performs passive regeneration at lower temperatures than that of a commercial base metal-palladium filter.

The catalyst formulation comprising silver supported on tetragonal zirconia was developed, thoroughly characterized and optimized.

Unlike the commercial CRT technology, the present invention discloses a new and less expensive silver-based catalyzed particulate filter, which offers low temperature oxidation of collected particulate matter performing continuous passive regeneration of the filter.

Effect of Calcination Temperature on Catalytic Properties of $Ag/ZrO_2$ Catalysts An improved version of the $30Ag/ZrO_2$ catalyst was developed with a significantly lower content of silver (decrease of 33%). This was achieved by changing the calcination procedure.

The effect of calcination temperature on the physical and chemical properties of $20Ag/ZrO_2$ and $30Ag/ZrO_2$ catalysts prepared by the same citrate sol-gel method was studied to determine the optimum pre-treatment conditions.

Table 1 below presents the physical characteristics for the catalysts pretreated at different conditions.

TABLE 1

Physical characteristics of $Ag/ZrO_2$ catalysts calcined at different conditions

| Physical Characteristics | $20Ag/ZrO_2$ | | $30Ag/ZrO_2$ | |
| --- | --- | --- | --- | --- |
| | 500° C. (10 h) | 550° C. (6 h) | 500° C. (10 h) | 550° C. (6 h) |
| Surface BET Area (m²/g) | 32.0 | 21.4 | 19.5 | 18.2 |
| Pore Volume$^a$ (cm³/g) | 0.18 | 0.15 | 0.12 | 0.13 |
| Ag Particle Size$^b$ (nm) | 18.9 | 27.5 | 29.8 | 44.8 |
| Ag Surface Area$^b$ (m²/g Ag) | 30.2 | 20.8 | 19.2 | 12.7 |

$^a$BJH desorption cumulative pore volume
$^b$Calculated from $O_2$-chemisorption data As seen from Table 1, the change in calcination temperature from 550° C. for 6 h to 500° C. for 10 h caused an increase of the BET surface area of both catalysts and the pore volume of 20 $Ag/ZrO_2$ catalyst.

The increase was markedly larger for the $20Ag/ZrO_2$ catalyst showing 32.0 m²/g surface area and 0.18 cm³/g pore volume, respectively.

On the other hand, this effect for the $30Ag/ZrO_2$ catalyst was significantly less pronounced as indicated by only a slight increase in its surface area from 18.2 m²/g to 19.5 m²/g.

Additionally, the new and improved calcination procedure influenced the Ag particle size and consequently the Ag surface area exposed to the reactants during reaction.

Table 1 shows Ag particle size of the $20Ag/ZrO_2$ catalyst that significantly decreased from 27.5 nm to 18.9 nm giving rise to a higher specific Ag surface area of 30.2 m²/g compared to 20.8 m²/g when the higher calcination temperature was used.

The calcination temperature influenced the sintering of Ag particles in the $30Ag/ZrO_2$ catalyst exhibiting smaller Ag particle size of 29.8 nm when calcined at 500° C. versus 44.8 nm after 550° C. calcination. Corresponding specific Ag surface area of 19.2 m²/g Ag versus 12.7 m²/g Ag were measured, respectively.

Larger surface area and pore volume can provide more active sites for gaseous reactants adsorption and activation and for building more contact points with soot particles.

Therefore, the calcination at 500° C. for 10 h reduced the degree of support and Ag sintering and affected pore properties advantageous to the reaction.

The catalytic properties of the catalysts calcined at different conditions were evaluated using TPO experiments with 10 vol % $O_2$/He.

The testing sample consisted of a mixture of a catalyst with carbon black in tight contact mode and weight ratio of 30:1. The change in combustion product ($CO_2$) concentrations as a function of temperature during TPO runs were measured by using a thermal conductivity detector (TCD) detector.

The catalytic performance was assessed by values of the temperature at the maximum carbon oxidation rate ($T_{max}$) that corresponded to the peak temperature in TPO profiles. A lower $T_{max}$ indicated a greater catalytic activity.

A typical profile of the $30Ag/ZrO_2$ TPO run is shown in FIG. 1.

Table 2 compares the values of the $T_{max}$ of silver-zirconia catalysts with different Ag loading and calcination conditions. The $20Ag/ZrO_2$ catalyst exhibited improved activity when calcined at lower temperature ($T_{max}$ of 371° C. versus 377° C.). The activity of the $30Ag/ZrO_2$ catalyst remained unchanged within the range of experimental error.

TABLE 2

$T_{max}$ from TPO runs of $Ag/ZrO_2$ catalysts calcined at different conditions

| | $T_{max}$ (° C.) After calcination | |
| --- | --- | --- |
| Catalyst | 500° C. (10 h) | 550° C. (6 h) |
| $20Ag—ZrO_2$ | 371 | 377 |
| $30Ag—ZrO_2$ | 372 | 373 |

Further evaluation of $Ag/ZrO_2$ catalysts calcined at different conditions was performed using a fixed-bed reactor with simulated diesel exhaust.

Figure 2:
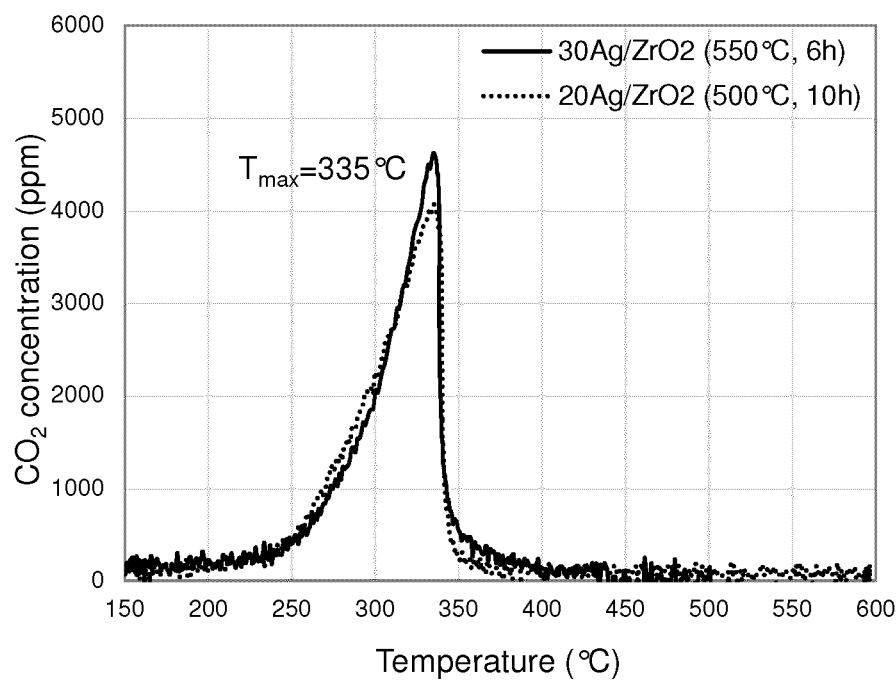
FIG. 2 shows the carbon dioxide concentration versus temperature profiles for $20Ag/ZrO_2$ (calcined at 500° C., 10 h) and $30Ag/ZrO_2$ (calcined at 550° C., 6 h) tested with 10 vol % $O_2$, 5 vol % $H_2O$, 500 ppm NO in $N_2$ and under tight contact mode.

FIG. 2 depicts the carbon dioxide concentration versus temperature profiles for $20Ag/ZrO_2$ (calcined at 500° C., 10 h) and 30Ag/ZrO$_2$ (calcined at 550° C., 6 h) tested with 10 vol % O$_2$, 5 vol % H$_2$O, 500 ppm NO in N$_2$ and under tight contact mode.

The maximum rate of carbon combustion was observed at 335° C. (T$_{max}$) for both catalysts.

This test demonstrated that the catalyst with the lower concentration of Ag exhibited the same activity for carbon oxidation as the catalyst with the higher Ag loading based on the same value of T$_{max}$. The increased activity of 20Ag/ZrO$_2$ catalyst may be due to the lower catalyst sintering during the calcination at milder conditions that resulted in the higher surface area of both zirconia and Ag active metal.

Engine Evaluation of Ag/ZrO$_2$ Catalyzed Particulate Filter—BPT Determination

The catalyst performance for soot oxidation was initially evaluated by TPO in a flow reactor using simulated diesel exhaust conditions, carbon black as a model soot and tight contact between carbon and catalyst particles. These lab reactor studies revealed a high activity of the developed catalyst for elimination of soot particles in the temperature range typical of diesel exhaust (200-500° C.) and in the presence of oxygen, water and nitrogen oxide. However, due to lab testing limitations, engine evaluation was required in order to assess the catalyst activity under real engine exhaust conditions.

The regeneration performance of the Ag/ZrO$_2$ catalyzed particulate filter loaded with the improved 20Ag/ZrO$_2$ catalyst was evaluated during an engine test. The balance point temperature (BPT), at which combustion of soot occurs at the same rate as soot loading, was determined during this test and used as evaluation criteria of the filter regeneration degree. The determination of balance point temperature is a required step in the catalyzed particulate filter development.

A commercial CDPF (Cattrap, CDTi Advanced Materials Inc.) was tested at the same conditions for comparison. To determine the balance point temperature, the engine tests were conducted with no diesel oxidation catalyst (DOC) unit at the upstream of the filter.

The catalytic phase comprises the improved 20Ag/ZrO$_2$ catalyst, which was loaded on the commercial 12.5 L wall-flow ceramic filter by slurry forcing method. After drying and calcination, the filter contained silver in the amount of 6.5 g/L.

Figure 3:
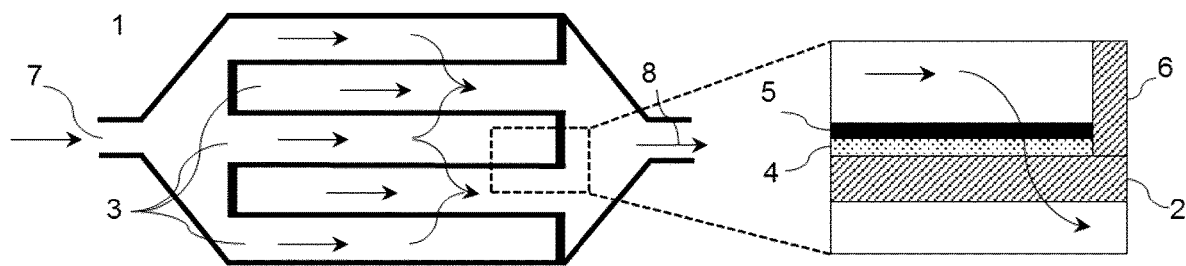
FIG. 3 shows the schematic of a wall-flow $Ag/ZrO_2$ catalyzed particulate filter with an enlarged view of a channel.

FIG. 3 shows the schematic of a wall-flow Ag/ZrO$_2$ catalyzed particulate filter 1.

The Ag/ZrO$_2$ catalyzed particulate filter 1 has a porous monolithic ceramic substrate 2 formed of parallel channels 3 and composed of cordierite.

A catalyst layer 4 coats the walls of the ceramic substrate 2. Soot particles 5 are deposited on the walls of the channels as the exhaust gas passes through the filter.

In the inlet end, every other channel is plugged with ceramic material, while the adjacent channel is plugged at the outlet end 6. The wall-flow structure forces the exhaust gas 7 to pass through the porous channel walls enabling cleaner gases to exit 8.

Table 3 below shows specifications for the Ag/ZrO$_2$ catalyzed particulate filter monolith.

TABLE 3

Catalyzed Particulate Filter Monolith Specifications
Catalyzed Particulate Filter

| | |
|---|---|
| Part Number | RDAB-01-5X57-21 |
| Serial Number | 296947 |
| Core Model | Duratrap AC |
| Material | Advanced Cordierite |
| Diameter (mm) | 230 |
| Length (mm) | 305 |
| Geometric Vol (L) | 12.7 |
| Cell density (cpsi) | 200 |
| Wall thickness (mils) | 12 |
| Porosity (%) | 50 |
| Silver (non - platinum group metal) loading (g/L) | 6.5 |

The Ag/ZrO$_2$ catalyzed particulate filter was tested with a Detroit Diesel heavy-duty engine (6063-WK32, Series 60, 11.1 L, 6 cylinder, Tier 1, turbocharger). The engine load was performed with an engine dynamometer.

Figure 4:
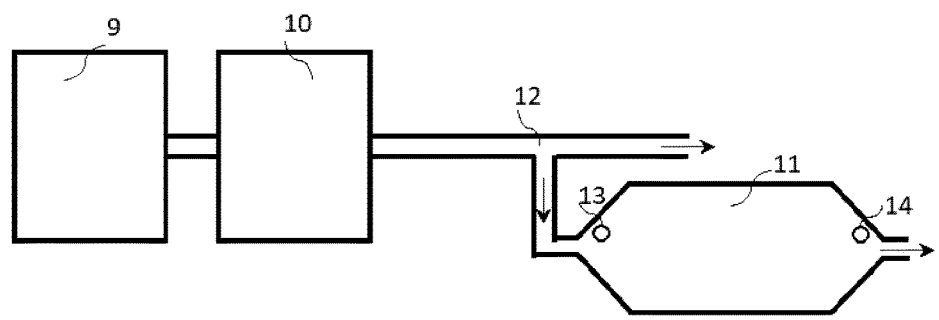
FIG. 4 shows the schematic of an engine test setup of an $Ag/ZrO_2$ catalyzed particulate filter.

The engine test bench setup shown in FIG. 4 consists of a Detroit Diesel engine 9 equipped with a Turbocharger 10 and a 12.5 L catalyzed particulate filter 11. The engine exhaust flow was split using splitter control valves 12 allowing a flow through the catalyzed particulate filter as high as possible, but that did not exceed 2 kPa delta pressure across the filter. The pressure drop, inlet and outlet temperatures of the catalyzed particulate filter were monitored by a differential pressure sensor and temperature thermocouples 13, 14.

A test procedure to determine the balance point temperature was developed based on a progressive load test in accordance with the program [Diesel Emissions Control Sulfur Effects (DECSE) Program, Phase 1, Interim Report 1, US Department of Energy, Washington DC, August 1999]. The procedure involved preloading the filter with soot to a predetermined level. Then a stepwise increase of the filter's inlet temperature was undertaken by increasing the engine load that was accompanied by recording the filter pressure drop. The temperature at which the pressure drop decreased was determined as a filter balance point temperature.

Test Procedure:
1. Weighing clean catalyzed particulate filter before the soot loading phase,
2. Soot preloading at a preselected speed/load to a predetermined loading level,
3. Weighing catalyzed particulate filter after the soot loading phase,
4. Determination of the balance point temperature by increasing engine loads progressively,
5. Measuring catalyzed particulate filter inlet and outlet pressure and temperature for each load,
6. Determination of delta pressure from positive to zero and negative, in other words from the transition between filter loading and regeneration.

Figure 5:
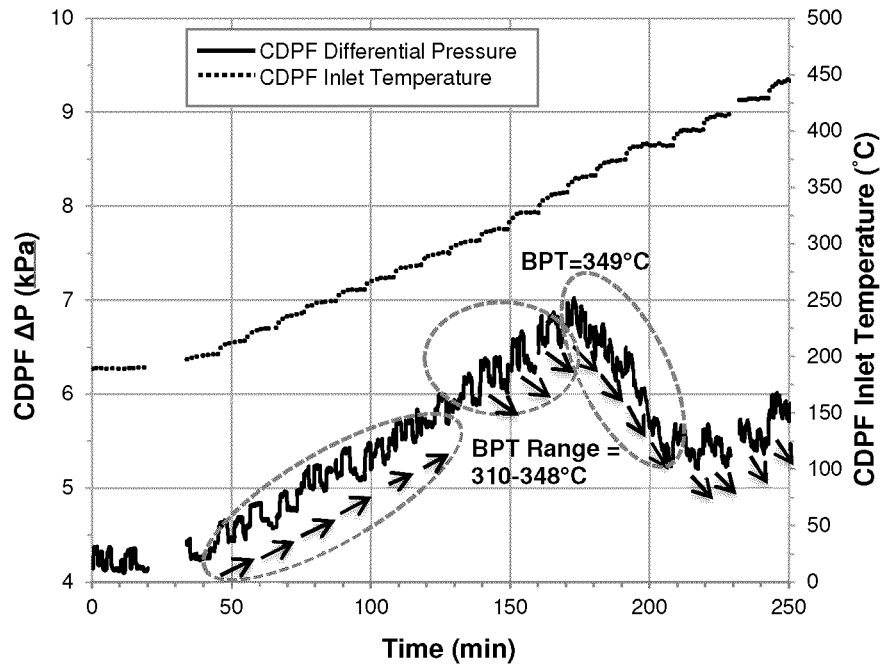
FIG. 5 shows the pressure changes during engine testing of a catalyzed filter wherein the filter is an $Ag/ZrO_2$ catalyzed particulate filter according to the present invention.
Figure 6:
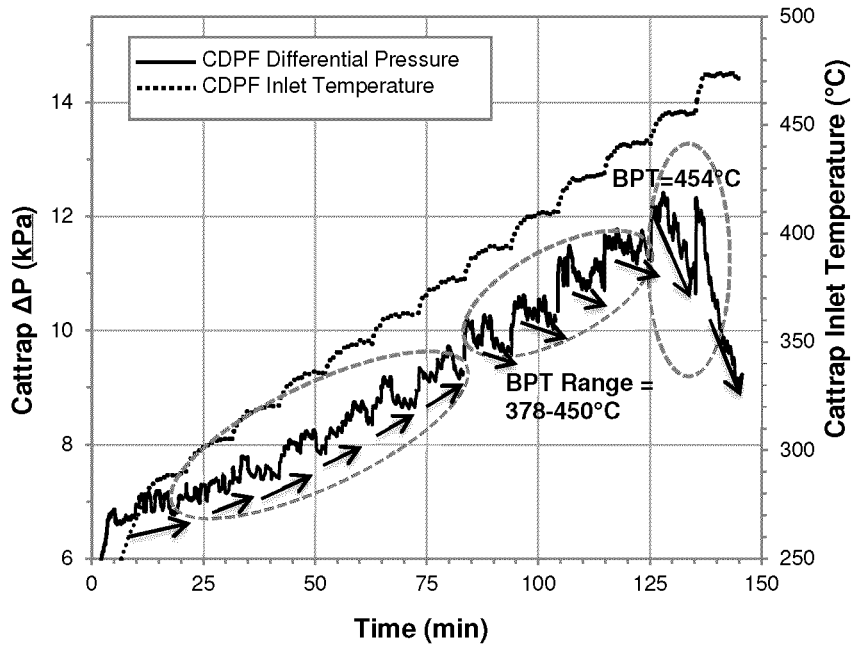
FIG. 6 shows the pressure changes during engine testing of a catalyzed filter wherein the filter is the same as used in commercial base metal-palladium "Cattrap" CDPF.

Testing results are presented on FIGS. 5 and 6.

FIG. 5 shows the pressure changes during engine testing of a catalyzed filter, wherein the catalyzed filter is an Ag/ZrO$_2$ catalyzed particulate filter according to the present invention.

FIG. 6 shows the pressure changes during engine testing of a catalyzed filter wherein the filter is the same as used in commercial base metal-palladium "Cattrap" CDPF.

The balance point temperature was determined by analyzing the slope of the differential pressure for each temperature steps. The temperature of exhaust increased with load monotonically. The pressure drops across the filter increased with temperature initially and started to decrease at certain point. This point, at which the reduction in pressure drop was observed (in other words, when the rate of particles oxidation was approximately equal to the rate of particles loading), was defined as a balance point temperature.

According to testing results, both filters exhibited a capacity to burn diesel particulate matter. The balance point temperature for the $Ag/ZrO_2$ catalyzed particulate filter (coated by the $20Ag/ZrO_2$ catalyst) was in the range 310 to 348° C., while the commercial base metal-palladium CDPF exhibited the balance point temperature in the range 378 to 450° C. matching closely the manufacturer's specifications.

The $Ag/ZrO_2$ catalyzed particulate filter was found to have a significantly lower balance point than that of a commercially available base metal-palladium "Cattrap" CDPF as shown in Table 4 below.

TABLE 4

Balance Point Temperature of Two Tested Catalyzed Particulate Filters

| Type of filter | Balance point temperature range (° C.) | Balance point temperature (° C.) |
|---|---|---|
| $Ag/ZrO_2$ catalyzed particulate filter | 310-348 | 349 |
| "Cattrap" CDPF | 378-450 | 454 |

Overall, the engine test results agreed with the lab test results confirming that the $Ag/ZrO_2$ catalyzed particulate filter coated with a new less expensive silver-based catalyst ($20Ag/ZrO_2$) offers low temperature oxidation of collected particulate matter, thus providing continuous passive regeneration of the filter at normal engine operating conditions.

A lowering of the balance point temperature allows avoiding active regeneration or decreasing the number of such cycles that reduce the use of fuel as well as $CO_2$ emissions.

Emission Test

The impact of the developed CDPF on diesel emissions was examined on an engine dynamometer using a medium-duty Deutz F6L914 Tier 2 diesel engine approved for use in underground mines. Emission characteristics were obtained at progressive load test. This test cycle was run at eighteen (18) points from zero load to the maximum load at 1500 rpm. The diesel fuel was the same as used in the previous test. The experimental setup was the same as for the balance point temperature test using splitter and no DOC in front of the filter.

All engine basic conditions were monitored. The temperature of the CDPF was consecutively increased and at a given temperature the CDPF started to contribute to catalytically assisted chemical reactions. Gaseous emissions including carbon monoxide (CO), unburned total hydrocarbons (THC) and nitrogen oxides ($NO_x$) were analyzed continuously at each points before (inlet port) and after (outlet port) the CDPF. The progressive load test was carried out on a "clean" CDPF, which had no preloaded PM. During the test, the pressure drop across the CDPF was also assessed.

The diesel PM was measured during the ISO 8178 C1 8-mode test cycle for non-road engine application. The 8-Mode test cycle for the Deutz F6L914 engine is defined in Table 5. Prior to the 8-Mode tests, the engine intake restriction at Mode 1 was adjusted to a maximum allowable value of 3 kPa for the engine, and similarly exhaust backpressure at Mode 1 was adjusted to a maximum allowable value of 10 kPa for all test cycles. The exhaust backpressure, CDPF inlet and outlet pressures, and exhaust temperature at the inlet and the outlet of the devices were recorded. PM was analyzed using a Sierra BG-3 partial flow dilution sampler.

TABLE 5

| ISO 8178-C1 8-Mode test cycle | | | | | | | | |
|---|---|---|---|---|---|---|---|---|
| Mode# | 1 | 2 | 3 | 4 | 5 | 6 | 7 | 8 |
| Engine Speed, rpm | 2300 | | | | 1500 | | | 600 |
| Torque, % | 100 | 75 | 50 | 10 | 100 | 75 | 50 | 0 |
| Weighting factor | 0.15 | 0.15 | 0.15 | 0.1 | 0.1 | 0.1 | 0.1 | 0.15 |

Figure 7A:
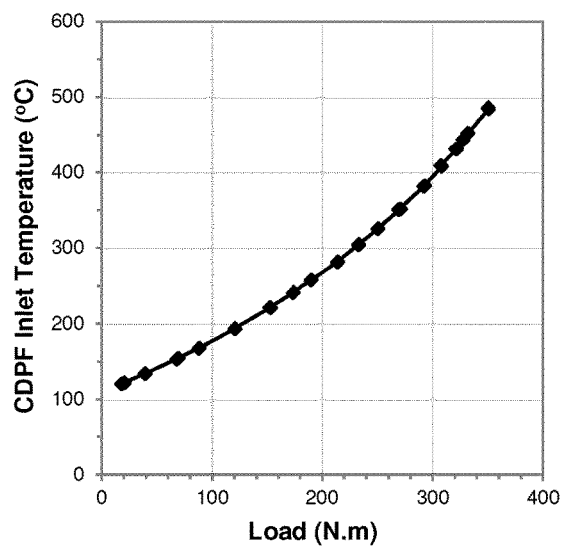
FIG. 7A shows a CDPF progressive load test: CDPF inlet temperature versus engine load at peak torque speed.
Figure 7B:
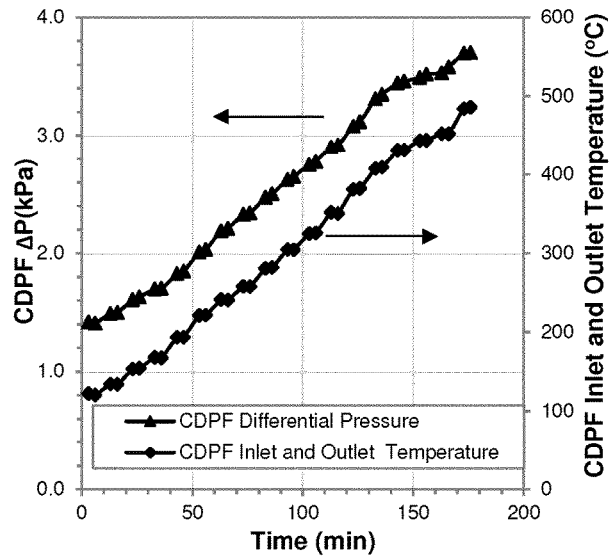
FIG. 7B shows differential pressure and CDPF inlet temperature versus time.

FIG. 7A shows that the CDPF inlet exhaust temperature was increased gradually by increasing the engine load in steps of about 20-25° C. The first two load points (20 to 40 N·m), measured in the low range of the torque meter had a variance of ±30%; and as result the following discussion ignores these two points. During the test, the pressure drop across the CDPF was also assessed (FIG. 7B) and did not exceed 3.8 kPa.

Carbon Monoxide (CO)

Figure 8A:
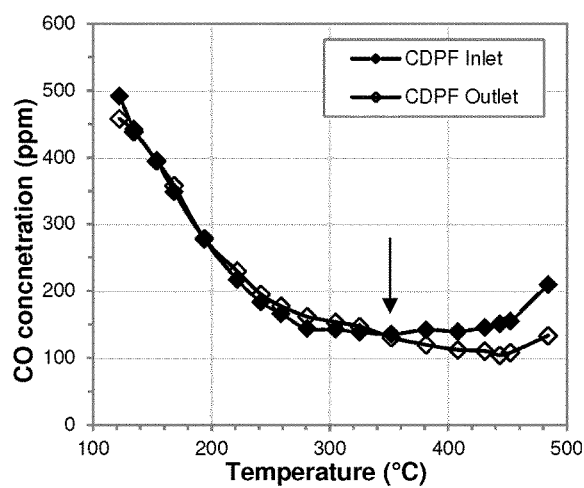
FIG. 8A shows CO emissions as a function of inlet temperature as measured at the CDPF inlet and outlet ports.

FIG. 8A shows the variation of the CO concentration before and after the CDPF with the inlet CDPF temperature measured without pre-DOC. At low engine speed, the CO emissions were maximum in the range from 450 to 500 ppm at temperature 120° C. With the increase of the engine load, the CO concentration in the engine exhaust decreased continuously with the temperature raise. This is due to the improved engine performance at elevated temperature leading to the more efficient burning of the fuel.

The difference in CO concentrations between inlet and outlet ports was observed at temperatures higher than 350° C. (pointed by an arrow) due catalytic oxidation by the Ag-based catalyst coated the DPF.

Figure 8B:
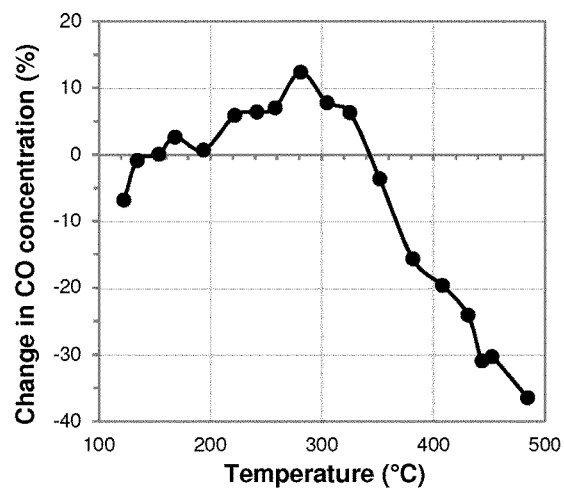
FIG. 8B shows the % change in CO concentration under testing conditions.

At high load and the temperature of 450° C., the CO emissions has reached a minimum of ~100 ppm that corresponded to the 35% improvement in CO reduction compared to its inlet concentration (FIG. 8B). An increase in CO concentration from 133 to 210 ppm was registered at the maximum engine load (480° C.) which was accompanied by the higher fuel/air ratio. As result, there was insufficient oxygen to convert fuel to carbon dioxide.

Unburned Total Hydrocarbons (THC)

FIG. 9A depicts the variation of the THC concentration with the inlet CDPF temperature measured without DOC in front of the filter, and it shows that THC emissions decreased with the increase of the load due to the more efficient combustion at elevated temperatures.

The Ag-based catalyst inside the CDPF started to oxidize THC at the temperature higher than 300° C. (pointed by an arrow) exhibiting the difference between inlet and outlet concentrations. From this point THC relative concentration permanently decreased (FIG. 9B). At the end of testing at 480° C., the final THC concentration after the CDPF was 76 ppm that was lower than that for the inlet port by 47%.

Nitrogen Oxides (NO and $NO_2$)

NO and $NO_2$ are formed due to incomplete fuel combustion and their content in diesel exhaust depends on engine parameters. One of these parameters is an in-cylinder temperature.

NO concentration versus the inlet temperature is shown in FIG. 10. The NO concentration varied linearly from 150 ppm up to the 715 ppm with engine load growth (120° C.-300° C.) that was in agreement with the influence of the combustion temperature on $NO_x$ formation. The overall impact of the CDPF on NO emissions was not pronounced since both inlet and outlet NO concentration curves are close. The minor difference between the inlet and outlet curves was found in a temperature range of 350 to 480° C. that may be due to the NO oxidation assisted by the catalyst.

FIG. 11A displays the variation in $NO_2$ concentration for different loading conditions and without the DOC in front of the filter. In the temperature range from 120 to 480° C. the continuous decrease in the CDPF inlet $NO_2$ concentration was observed because the thermodynamic equilibrium shifted towards NO and $O_2$ at high temperatures. The outlet $NO_2$ concentration changed differently. At relatively low temperatures (<300° C.) higher decrease of $NO_2$ in outlet port may be due to its adsorption on the surface of the catalyst inside the CDPF forming mostly silver nitrates. $NO_2$ adsorption was reflected in the relative decrease of $NO_2$ concentration at this temperature range (FIG. 11B). The thermal decomposition of silver nitrates takes place at a temperature of 300-450° C. producing silver, $NO_2$ and $O_2$. Thus, a slight increase in $NO_2$ concentration could be linked to the nitrate decomposition and desorption from the catalyst surface that corresponded to the positive values of the relative concentration change (FIG. 11B). While decomposition/desorption was getting lower (T>400° C.), the outlet concentrations became closer to the inlet ones exhibiting limited $NO_2$ formation (24 ppm versus 15 ppm, respectively). Overall, the catalyst coat did not produce significant amount of extra $NO_2$ at all exhaust temperatures.

Emissions 8-Mode Test

FIG. 12 shows the comparison of PM emissions measured at inlet and outlet of the CDPF during 8-mode emission test.

As the inlet temperature increased (mode 1 and 5), the PM emissions increased and reached the highest values of 8.7 g/hr. The efficiency of the PM reduction for these modes corresponded to 85 and 95%, respectively. The mode 8 with the lowest load and temperature showed the lowest value of 1.6 g/hr PM in the exhaust and efficiency of the PM reduction of 93%. In the middle range of operating temperatures the PM emissions varied between 2 and 4 g/hr and the PM reduction changed from 68 (mode 3) to 86% (mode 7). Overall, the average reduction of PM mass through the CDPF was found to be 85.7% (Table 6), which would meet the EPA Tier 4 requirements of 0.02 g/kW.

A summary of other emissions assessment is presented in Table 6. The average percentage of emission change was calculated from the 8-mode test. At average temperature of 325° C., a significant reduction in THC and approximately 37% was observed demonstrating catalyst activity for hydrocarbon oxidation under experimental conditions.

Additionally, Table 6 shows the decrease of CO emissions by approximately 15% that was due to the oxidation of CO by the catalyst. $NO_2$ emissions were decreased in average by 30%, however, total amount of $NO_x$ did not change significantly due to the back reduction of $NO_2$ to NO during soot oxidation. Overall, the impact of the developed aftertreatment device did not significantly affect $NO_x$ emissions removal.

TABLE 6

Integrated 8-Mode Emissions

| Test Points | Units | Weighted Average (Inlet) | Weighted Average (Outlet) | Emission Change (%) |
|---|---|---|---|---|
| Parameters | | | | |
| Speed | rpm | 1845 | 1845 | NA[a] |
| Torque | N · m | 174.9 | 175 | NA |
| Power | kW | 35.4 | 35 | NA |
| Exhaust temperature | ° C. | 344.8 | 343.3 | −0.4 |
| CDPF temperature | ° C. | 325.9 | 323.4 | −0.8 |
| Emissions | | | | |
| $CO_2$ | g/hr | 28685 | 28583 | −0.4 |
| CO | g/hr | 99 | 84 | −15.2 |
| $NO_2$ | g/hr | 24 | 17 | −29.2 |
| NO | g/hr | 192 | 195 | 1.6 |
| $NO_x$ | g/hr | 215 | 212 | −1.4 |
| THC | g/hr | 38 | 24 | −36.8 |
| PM | g/hr | 4.06 | 0.58 | −85.7 |
|  | g/kWt | 0.110 | 0.016 | |

[a]Not applicable

The present invention discloses that the developed CPDF is effective for the passive regeneration at temperatures from 300° C. with a BPT of 350° C. that is 100° C. lower than that of the commercial filter indicating the better performance of the new catalytic Ag-based coating compared to that of the commercial base metal-palladium Cattrap filter.

A lowering of the BPT allows avoiding active regeneration or decreasing the number of such cycles that lower fuel penalty and related $CO_2$ emissions.

The average reduction of CO, THC and $NO_2$ obtained during emission test with the novel CDPF were found to be 15%, 37% and 30%, respectively, within a wide temperature range. Furthermore, the average effectiveness of the PM mass removal was found to be higher than 85% keeping the back pressure within the application requirements for the engine. The advantage of using Ag-based catalyst is the elimination of $NO_2$ slip from the CDPF that could avoid increasing the ventilation airflow rates.

The tested Ag-based catalyst coated CDPF presents advantages economically due to the lower cost of silver compared to that of palladium, but still possessing sufficient ability to oxidize PM, CO and THC.

Therefore, the developed CDPF presents a suitable and less expensive alternative to the base metal-palladium commercial filter for PM removal.

While the present invention has been described in considerable detail with reference to certain preferred and/or exemplary embodiments, it will be understood by those skilled in the art that various changes may be made and equivalents may be substituted for elements thereof without departing from the scope of the invention. In addition, many modifications may be made to adapt a particular situation or material to the teachings of the present invention without departing from the essential scope thereof. Therefore, the scope of the appended claims should not be limited by the preferred embodiments set forth in the examples, but should be given the broadest interpretation consistent with the description as a whole.

The invention claimed is:

1. A catalyzed particulate filter for soot removal from engine exhaust, said particulate filter is loaded with a silver-zirconia catalyst $xAg/ZrO_2$, wherein x is the mole fraction of Ag in %, and wherein the silver-zirconia catalyst is prepared by citric acid-assisted sol-gel method and calcinating at 500° C. for about 10 hours.

2. The catalyzed particulate filter for soot removal from engine exhaust according to claim 1, wherein the soot removal from engine exhaust is used for lean-burn internal combustion.

3. A method of making a catalyst $xAg/ZrO_2$, wherein x is 20 mol %, said method comprises:
   mixing aqueous solutions of $AgNO_3$ and $ZrO(NO_3)_2$ hydrate to produce a first mixture,
   adding an aqueous solution of citric acid to the first mixture, wherein the molar ratio of metal ions to citric acid is about 1:3 to produce a second mixture,
   heating the second mixture to about 80-90° C. to evaporate excess water in the second mixture to form a viscous gel,
   charring the viscous gel at about 200° C. for about 12 hours to produce a foam-like material,
   grounding the foam-like material to form a grounded material, and
   calcinating the grounded material at 500° C. for about 10 hours.

4. A catalyzed particulate filter for soot removal from engine exhaust, said particulate filter is loaded with a silver-zirconia catalyst made according to claim 3.

5. The catalyzed particulate filter for soot removal from engine exhaust according to claim 4, wherein the soot removal from engine exhaust is used for lean-burn internal combustion.

\* \* \* \* \*